Patented July 2, 1935

2,007,053

UNITED STATES PATENT OFFICE 2,007,053

METHOD OF MAKING POROUS ARTICLES OF CERAMIC BONDED GRANULAR MATERIAL

Wallace L. Howe, West Boylston, Mass., assignor to Norton Company, Worcester, Mass., a corporation of Massachusetts No Drawing. Original application March 18, 1932, Serial No. 599,851. Divided and this application March 6, 1935, Serial No. 9,643. In Great Britain April 4, 1932

5 Claims. (Cl. 25—156)

This invention relates to a method of making porous articles and more particularly rigid, porous, ceramic bonded bodies which are permeable to the passage of liquids and gases and which are adapted for use as filters, diaphragms and diffusion devices for various biological, chemical, metallurgical and electrochemical processes, and for other purposes. This application is a division of my copending application Serial No. 599,851 filed March 18, 1932 relating to Porous articles of ceramic bonded granular material and a method of making the same.

Heretofore, porous diffusion and filtering mediums have commonly been made from mixtures consisting of mineral granules united by various bonding agents, such as cements, in which the proportions of bond used have been reduced to a minimum in order to obtain the highest degree of porosity. The result has been that such products have not possessed great mechanical strength when made in large sizes. Furthermore, certain of the bonds employed have low temperature resisting qualities and are chemically affected by some of the chemical reagents to be filtered. It is also found that certain kinds of mineral particles have the property of permanently changing their form and volume when subjected to high temperature conditions. Hence, fused bodies made from mixtures containing mineral granules of this type had to be rubbed down or ground to the desired size in order to obtain the required final dimensions for the porous mediums. It has also been found that these previous materials, while they serve for the purpose of giving sufficient mechanical strength to the burned shapes, do not have the desired plastic properties required for the molding process; hence the variety of shapes in which the mixture may be formed is limited. Furthermore, such prior bodies have not involved a uniform and controlled permeability.

It is accordingly an object of my invention to overcome these difficulties and to provide a method of making a porous diffusion and filtering medium which will be efficient and serviceable in use, which will possess a high degree of uniformity in texture and structure and which may be used for the purpose of filtering or diffusing various kinds of fluids in general, and particularly whereby the permeability of the article may be regulated and controlled to a close degree of accuracy and a desired physical structure obtained.

As a result of my experimentation, I have discovered that a porous article for such purposes having a selected degree of permeability may be made as a refractory composition consisting of a hard, granular, highly refractory material bonded with a vitrified ceramic bond having a high content of a low melting material. For the refractory material, I preferably employ grains of a highly refractory substance, such as silicon carbide or granular crystalline alumina, which may be in the form of corundum, emery or electrically fused and crystalline alumina, and which when heat treated will not be fused at the kiln temperature and will not be permanently changed in volume or altered in physical strength. In order to bond these materials together, I may preferably use as a vitrifiable ceramic bond, a plastic and moldable mixture of clays, which when burned forms a bond composition possessing low shrinking characteristics, high mechanical strength and highly refractory qualities. As one ingredient of this bond mixture, I propose to employ a refractory type of clay which is high in alumina and has a low flux content, that is, low in MgO, CaO, $Na_2O$, $K_2O$ etc., and preferably a clay of that type known as ball clay. A typical analysis of the percentage composition, based on the fused analysis, of one refractory ball clay which has these desirable characteristics is as follows:

| | |
|---|---|
| $SiO_2$ | 65.00 |
| $Al_2O_3$ | 29.00 |
| $Fe_2O_3$ | 2.00 |
| MgO | .45 |
| CaO | .40 |
| $Na_2O$ | .40 |
| $K_2O$ | 1.20 |
| $TiO_2$ | 1.55 |
| Total | 100.00 |

To illustrate the use of such a clay with other ceramic materials, I mix with this more refractory and porcelain type of bond, in definite and precalculated amounts, suitable fluxing agents or other ceramic materials adapted to lower the fusion point of the refractory bond, such as slip clay and feldspar. Such a mixture will form, at the firing temperature, a bond composition of the required degree of refractoriness and fluidity. Suitable bond compositions may be formed from the usual ternary mixture of ball clay, slip clay and feldspar, within the range of the following proportions:

| | Parts by weight |
|---|---|
| Ball clay | 20 to 50 |
| Slip clay | 30 to 75 |
| Feldspar | 0 to 30 |

The bond ingredients are carefully selected and proportioned in order that the bond mixtures obtained may have definite fusion points and each form, when fused at its respective firing temperature, a satisfactory bond of desired characteristics. For one type of porous medium, I may bond crystalline alumina grains of any suitable size with a mixture such as described in the proportions of from 5% to 40% of bond by weight of the total mass, these proportions depending upon the shape of the article to be made and the degree of permeability to be obtained.

The approximate composition of typical porous mediums of the standard classes below named and their respective differences in physical structure and degrees of permeability due to variations in the proportions of the materials employed may be tabulated as follows:

| Standard plate 12 x 12 x 1" | Average permeability | Average grit size of grains in meshes per sq. in. | Ounces of bond per pound of grains (low melting ceramic material) | Average volume structure | | | |
|---|---|---|---|---|---|---|---|
| | | | | Percent granular material | Percent bond | Percent pores | Average diameter of pores |
| Fine | 4 cu. ft | 120 | 3½ | 48.5 | 15.5 | 36 | 0.09 mm. |
| Medium | 20 cu. ft | 60 | 3½ | 49.3 | 15.7 | 35 | 0.21 mm. |
| Coarse | 40 cu. ft | 36 | 3½ | 50.0 | 16.0 | 34 | 0.30 mm. |

As a result of my research and experimentation with various bond compositions which I have found to be suitable for making porous ceramic structures, I have discovered that the type of bonding material employed has a direct relation to the permeability of the product. For example, I have made the following observations of ceramic mixtures for porous mediums, such as plates, in which the proportions of bond were kept constant by analysis, namely, 17.5% by weight of the total dry, unfired mixture, and in which the grain size and shape is identical. In each case, the bond consisted of a mixture of a refractory clay, such as ball clay, and low melting ceramic materials or fluxing agents, such as slip clay and feldspar. The following table shows certain observed relations between the permeability of the product and the proportions of the several ingredients which compose the bond mixture when combined to form the constant amount above specified.

| Bond | | | | Permeability per unit area per 1 in. thickness | Volume structure | | |
|---|---|---|---|---|---|---|---|
| Mixture | Grain size | Percent low melting | Percent refractor | | Percent granular material | Percent bond | Percent pores |
| I | #24 | 4.5 | 13.0 | 17.3 | 51.9 | 16.1 | 32.0 |
| II | #24 | 13.0 | 4.5 | 39.8 | 51.9 | 16.1 | 32.0 |

In the light of my discovery, I have found that the bond designated as (I) mixture, which contains a greater percentage of the more refractory bond, such as ball clay, produces a product having a much lower permeability than is obtained from the (II) mixture having a high content of low melting ceramic material, for the same volume structure of the porous medium. It is believed that the bond consisting of the (I) mixture, being the more refractory of the two mixtures at the kiln temperatures, which is at approximately 1300° C., becomes vesicular during the firing procedure, thus occupying a larger apparent volume than is the case with the bond composition of the (II) mixture, and thus seals many of the natural capillaries and pore spaces in the mass. The (II) composition, while it also passes through a vesicular stage during the firing procedure, is a more fluid type of bond and settles down over the grain surfaces in a solid glass film, thus allowing the formation of free capillaries and open pore spaces through which air may pass. In other words, although both of these bonds become vesicular during the process of heat treatment, the one which is the more fluid at kiln temperatures settles back into smooth glass films which envelop the granular material. The more refractory bond, however, namely, the mixture high in ball clay, is so viscous that it does not settle back appreciably on the grain surfaces but tends to web over some of the natural capillaries of the body and form a large number of closed pores which materially reduces the permeability of the mass.

The percentage of the more refractory material in the bond mixture has, therefore, a direct relation to the permeability desired since it determines the degree of fluidity of the bond at a given firing temperature. I propose, as above indicated, to proportion the amounts of these materials in the bond mixture whereby a better control of the permeability of the product can be had. For example, increasing the percentage of the lower melting material in the bond mixture will increase the fluidity of the bond and tend to eliminate the closed vesicular pores. There will be no closing up of the natural capillaries in the article since the bond settles down on the grains as a glassy film, thus leaving the pore spaced freed. Control of permeability may then be accomplished by altering the grain sizes of the granular material employed and by using a "mulled" type of grain, i. e. grain from which the sharp corners have been removed so that better packing of the particles is obtained with a consequent uniformity of permeability and size of pore spaces throughout the entire body.

As an illustration of one bond composition which will be satisfactory for use with a refractory material consisting largely of crystalline alumina for the purpose of making a bonded medium in accordance with this invention, I may employ the following ingredients in the proportions specified:

Per cent by weight
Ball clay _____ 25
Slip clay _____ 60
Feldspar _____ 15

The chemical composition of this bond, as based on the fused analysis, has been calculated to be approximately as follows in percentages by weight:

| $SiO_2$ | $Al_2O_3$ | $Fe_2O_3$ | $MgO$ | $CaO$ | $Na_2O$ | $K_2O$ | $TiO_2$ |
|---|---|---|---|---|---|---|---|
| 64.3 | 19.3 | 4.6 | 2.1 | 3.7 | 1.3 | 3.8 | 0.9 |

This composition fuses to a glass of the required fluidity for bonding crystalline alumina at a temperature in the vicinity of 1250° to 1300° C.

As a specific example of a porous medium made up of this bond composition, I may use crystalline alumina of .46 grit size, i. e. those grains which just pass through a screen having 46 meshes to the linear inch, and in which 89.5% by weight of crystalline alumina grains are employed with 10.5% of the bond. The granular refractory material may be used in a variety of sizes of grain, which is sometimes advantageous to obtain the required degree of permeability, or the particles may be uniform in size, as desired. For general purposes however, the granular material employed may comprise crystalline alumina grains in grit sizes of from #8 to #400 mesh. The bond and the refractory grains are thoroughly mixed, and preferably in a dry condition, after which sufficient water is then added to produce such a degree of cohesiveness that the mass will hold together during the subsequent operations until the bond has been hardened. Ordinarily, sufficient water is added to form 1¾ to 5% by weight of the total mass, depending upon the type and amount of the bond employed. If desired, a small amount of an organic binder, such as dextrine, may be mixed with the bond and the grains, which serves as a temporary binder to give added strength to the mixture and improve the coherence of the mass, so that in the case of large, thin, unburned shapes, no difficulty is experienced in handling them while in the "green" state during the course of manufacture.

After the mass has been wetted with water or other suitable agency to develop its plastic and workable properties, a proper quantity of the mixture, sufficient to constitute a definite volume of solids, is placed in a mold of the desired shape and dimensions and then formed and compacted to the mold shape and to a predetermined mold volume, as by means of a press or other molding apparatus, in order that the mass after firing may comprise a precalculated volume structure of the materials. The shaped mass being in a substantially dry condition may then be fired in a ceramic kiln under standard conditions, as is well known in this art, to a temperature sufficient to fuse and vitrify the bond and unite the refractory grains into an integral mass.

This step of making a porous medium so that it has a predetermined volume structure may be accomplished in the manner set out and described in the U. S. Patent to Howe and Martin No. 1,983,082 dated December 4, 1934. One may readily determine the volume which will be occupied in the fired medium by a given weight of raw bond, and also the volume which will be occupied in the fired medium by a given weight of the refractory grains. Knowing the required dimensions and the volume percentages of bond and granular material which are desired in the final medium, the quantities of bond and grains by weight may be readily calculated and in this manner any predetermined or specified volume structure and permeability may be produced. Any one familiar with ceramic practices will, of course, understand that proper account should be taken in these calculations of weight losses and volume changes brought about by the firing process.

In the manufacture of a porous medium of the standard size, namely, a 12" x 12" x 1" plate, these dimensions having been found to be most suitable for the usual installations, which will have a permeability of 25 cubic feet of air per minute under a pressure of 2" of water, and in which the desired volume structure of the final medium comprises 52% by volume of granular material, 9% by volume of bond and 39% by volume of pores, I place 11.8 pounds of this mixture in a mold of the desired size and shape, after which the material is formed and compacted to the precalculated volume desired in the finished medium, which for a plate of standard size is 144 cubic inches, as by means of a pressing operation or other suitable molding process. The material in the mold should be spread evenly and uniformly over the entire mold surface, as by means of a leveling operation, to prevent the formation of a cone whereby the center portion will become more dense than the edges and corner portions and so result in a non-uniformity of the product.

Since the raw mixture has thus been shaped in an almost dry condition, it may thereafter be fired without any intermediate drying operation, but if desired it may first be subjected to a suitable intermediate drying operation to eliminate any detrimental swelling tendencies. The bond hardening operation is carried on in accordance with the standard practice for vitrified products, in which the molded mass is fired in a kiln under standard conditions at approximately Seger cone #13, or at a temperature of about 1300° C. for a suitable length of time, such as 100 hours. This firing operation results in vitrifying or fusing the clay bonding material to a glassy condition and uniting the refractory grains into a substantially integral mass, the individual grains of refractory material being joined together at the points of contact with a highly aluminous glass bond.

In accordance with this invention, I have provided a simple and economical method of producing refractory porous articles in large quantities and of uniform size and appearance, in which there is great uniformity of permeability throughout the entire body of the mass; this quality not being confined to the surface skin alone. I have, furthermore, provided a porous medium which is highly resistant to chemical attack by the common acids and one in which the bond is unaffected by the ordinary organic solvents, such as alcohol, benzol, naphtha, ether, chloroform, acetone, and the like. In making these improved porous mediums, I am also able to vary the degree of porosity and of permeability within certain limits by varying the proportion of the more refractory constituent of the clay bond composition, i. e. the ball clay, in which case the highest degree of porosity, meaning open pores, and apparent permeability is secured in the product by using a low percentage of refractory ball clay such as 20% by weight of the total bond employed. With the use of crystalline alumina, which is found to be more easily bonded than the mineral grains heretofore used, it is possible to manufacture porous articles having as fine a pore size as would approach the point where the capillarity of the fluids to be passed would cause a sealing of the pore system. This result cannot readily be attained with the prior mediums composed of bonded mineral grains, such as ground quartz. The improved mediums, however, can be manufactured to the desired finished dimensions and do not have to be rubbed or ground to size, due to the elimination of the prior warping tendencies arising from permanent volume changes of the mineral grains, since the bodies are made accurately to a definite and predetermined structure so as to have substantially known shrinkage characteristics and the refractory material selected is one which does not undergo a permanent change in volume or loss in strength, upon being heated to the temperature employed in firing the article.

It is also to be noted that diffusion mediums, such as plates, which are particularly adapted for the purpose of aerating and activating sewage sludge on a commercial scale, may be advantageously made in accordance with this invention. As a result, an improved and superior diffusion medium is provided, the properties of which differ from other prior porous mediums of equal thickness in these particulars, greater uniformity of texture and structure within single mediums and throughout a series of the same; low pressure loss of the fluid through the body, meaning the resistance offered by the wet saturated plate when passing a definite volume of the fluid per unit of time; three to four times the strength in cross bending, i. e. a higher modulus of rupture; a high degree of refractoriness; and finally greater chemical stability, since it is more resistant to the attacks of both acids and alkalis. Furthermore, the greater mechanical strength of these bonded materials will allow for the making of mediums of much higher permeability. A greater range of permeabilities is also possible with small variation of permeability within the product. Other advantages and possibilities inherent in this structure will be apparent to one skilled in the art.

The Seger cone system of heat measurement, as used in the specification and the claims, refers to the method usually employed for determining the heat of a kiln during firing of ceramic bonded articles, such as grinding wheels, in which a set of small, pyrometric cones composed of clays having different melting points and in different proportions, each cone being made with a definite fusibility, are placed in the kiln to fuse or soften at successively increasing heat treatments during which the appearance of the cones show the progress of firing attained therein and when the firing is complete.

Having thus described my invention, what I claim as new and desire to secure by Letters Patent is:

1. The method of making a highly permeable, porous article of ceramic bonded material comprising the steps of mixing highly refractory granular material of selected grain size, which upon being heated to the firing temperature of the body is substantially incapable of any permanent volume change, with a vitrifiable ceramic bond containing a low percentage of a refractory clay and a relatively higher amount of a low melting fluxing material which are so constituted and proportioned that the bond will be a highly fluid glass at the firing temperature of Seger cone 13 and will be free from undissolved material and a vesicular structure, the bond constituents being present in an amount such that the grains will lie substantially in contact with one another and will be cemented together into an integral porous body without forming closed pores to any large extent, molding the article and firing the same at a temperature not less than Seger cone 13 and causing the bond to flow and settle down as a coating over the grain surfaces and leave the pore spaces open, interconnected and permeable whereby the permeability of the article is determined largely by the size of the grains and the relative proportions of grain, bond and pores.

2. The method of claim 1 in which the highly refractory granular material consists of crystalline alumina grains, and the fluxing material of the ceramic bond includes slip clay.

3. The method of claim 1 in which the highly refractory granular material consists of crystalline alumina grains, and the ceramic bond is composed of refractory ball clay high in alumina and a fluxing material which comprises slip clay and feldspar.

4. The method of claim 1 in which the highly refractory granular material consists of crystalline alumina grains, and the refractory clay constituent of the bond comprises ball clay while the fluxing material thereof includes slip clay, said crystalline alumina grains being mulled and their edges and corners rounded so that they are nearly equi-dimensional in all directions, whereby the article thus made has a permeability of not less than four cubic feet of air per minute per square foot under a pressure head of two inches of water.

5. The method of making a highly permeable, porous, vitrified ceramic article adapted for use as a filtering medium comprising the steps of mixing highly refractory granular material of selected grain size, which upon heat treatment does not permanently change in volume, with a vitrifiable clay bond containing a low percentage of refractory ball clay and a relatively high content of a low melting fluxing material, the bond ingredients being proportioned to form a bond mixture which is capable of being fused to a glassy condition at the firing temperature of Seger cone 13 and the combined proportions of grain and bond having been calculated to give a definite strength to the bonded article and predetermined volume percentages of grain, bond and pores therein, forming a moldable mass thereof, shaping it in a mold while causing the material to occupy a predetermined mold volume so that the bonded article will contain definite volume percentages of bond and grains and will have a predetermined permeability, and thereafter firing the mass to fuse the bond and thereby unite the grains into an integral body whereby the permeability of the article is determined largely by the size of the grains and the volume percentages of grain and bond in the body.

WALLACE L. HOWE.